US005992014A

United States Patent [19]

Beery

[11] Patent Number: 5,992,014

[45] Date of Patent: Nov. 30, 1999

[54] DIESEL ENGINE INJECTION PUMP TIMING TOOL AND METHOD

[76] Inventor: Thomas Drew Beery, 1036 Aaron Dr., Deltona, Fla. 32725

[21] Appl. No.: 09/014,895

[22] Filed: Jan. 28, 1998

[51] Int. Cl.[6] .......... B23P 15/00

[52] U.S. Cl. .......... 29/888.011; 29/888.01

[58] Field of Search .......... 29/88.01, 888.011, 29/888, 428.1

[56] References Cited

U.S. PATENT DOCUMENTS

| | | | |
|---|---|---|---|
| 4,845,818 | 7/1989 | Perry | 29/888.011 |
| 5,425,168 | 6/1995 | Bumbaco et al. | 29/888.011 |
| 5,845,397 | 12/1998 | Reedy et al. | 29/888.011 |

*Primary Examiner*—I Cuda

*Attorney, Agent, or Firm*—Edward M. Livingston, Esq.

[57] ABSTRACT

A method of using diesel engine injection pump timing tool having two components, a first tubular cylindrical component (1) being internally threaded on one half for attachment to the fuel injection pump and externally threaded on the other half with a square drive wrench hole (8) in the end. A second cylindrical component (2) larger than the first component which contains internal threads on one end for rotatable attachment to the threads (4) of the first component (1). The second component (2) also contains a socket wrench attachment on the outer distal end for rotating the tool onto the first component (1) and also for turning the fuel injection pump to the proper position. The second component (2) may have a knurled grip (5) on a portion of the extended surface for better hand gripping purposes.

1 Claim, 2 Drawing Sheets

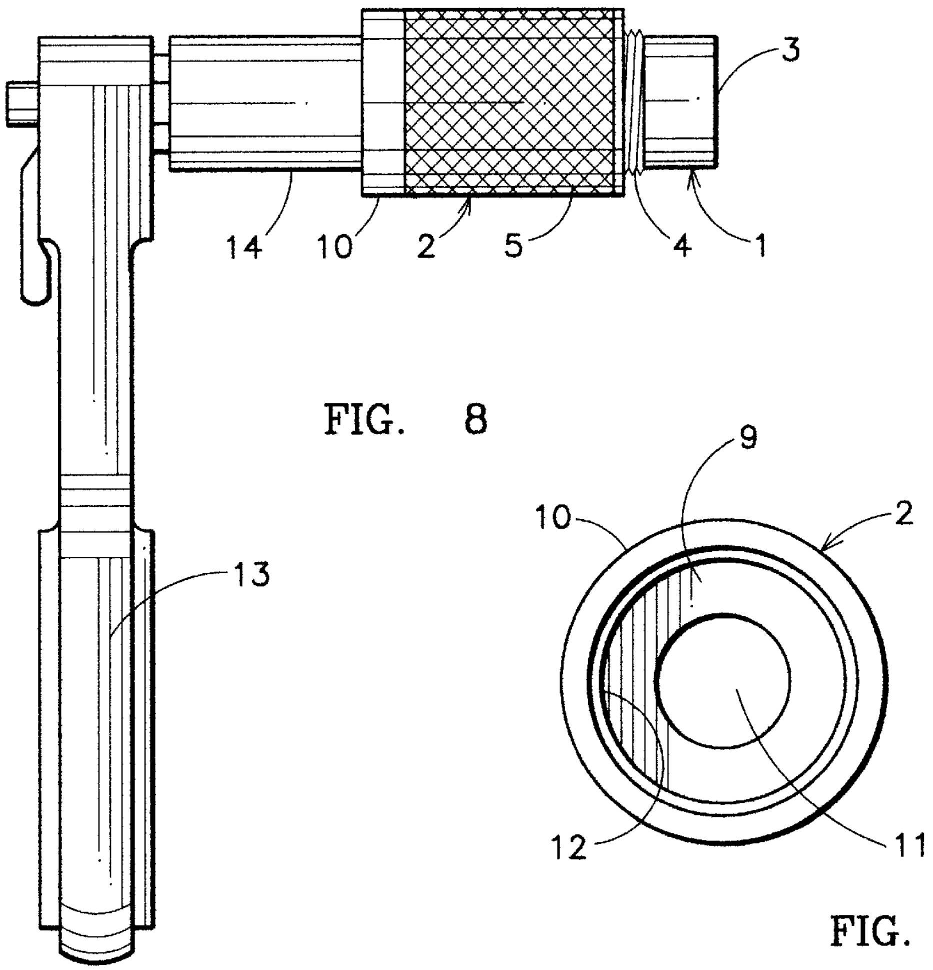
FIG. 8
FIG. 7
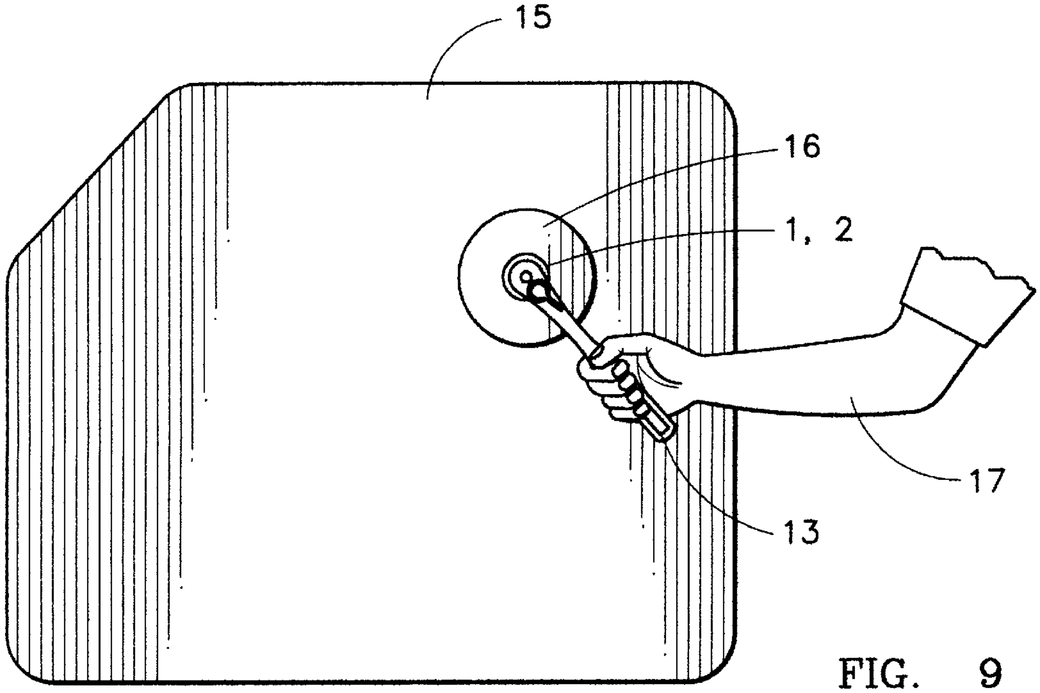
FIG. 9

DIESEL ENGINE INJECTION PUMP TIMING TOOL AND METHOD

BACKGROUND OF THE INVENTION

This invention relates to tools and more particularly, a tool for use in setting the timing on diesel engines made by Cummins Engine Co., Inc. ("Cummins"), specifically, the Cummins' B&C series engines equipped with an in-line injection pump.

Maintaining the proper timing of fuel injection pumps on diesel engines is important to the overall performance and useful life of a diesel engine. Currently the procedure used to set the timing of in-line injection pumps on diesel engines is a very time-consuming static process normally taking in excess of two hours to accomplish. Furthermore, as current timing procedures require the fuel injection pump to be turned to the proper timing position, the diesel engine itself must be rotated manually, often with difficulty to get the pump in the proper timing position. The latter process is often a trial and error procedure which is not only time consuming, but costly in terms of labor and down time.

Thus, a need exists for a device and method for setting the timing of diesel engine injection pumps which is easier, faster and more accurate.

The prior patented art contains no tool like the present invention. There are a few devices for use in timing of diesel or internal combustion engines, but none has the same structure, purposes or benefits of the present invention. For instance, U.S. Pat. No. 5,440,947 issued to Manganelli on Aug. 15, 1995, teaches a tool for locking the flywheel of a diesel engine in place for timing purposes. U.S. Pat. No. 5,414,941 issued to Carpenter on May 16, 1995, concerns a diesel engine service kit, including a holding fixture and tools without having to remove the engine bolt or needing a separate dial indicator. British Patent No. 4239 issued on Oct. 30, 1913, discloses a timing device for use on internal combustion engines. Other devices in the prior art having partial similarities and structures but for other purposes include those shown in U.S. Pat. No. 5,425,290 issued to Fought, et al. on Jun. 20, 1995; U.S. Pat. No. 5,320,005 issued Hsiao on Jun. 14, 1994; U.S. Pat. No. 3,007,504 issued to Clark on Nov. 7, 1961; U.S. Pat. No. 3,630,108 issued to Stillwagon, Jr. on Dec. 28, 1971; and Japan Patent No. 3-128402, dated May 31, 1991. However, none of the latter patents show devices which are the same or useable for similar purposes.

Briefly, the present invention provides a tool and method which reduces the time required to set the timing of a diesel engine using current procedures of more than two hours to approximately thirty minutes, a four-fold time savings. Further, this invention enables one to turn the fuel injection pump to the proper timing position without having to manually rotate the diesel engine to do so. The tool is comprised of two components: one piece is a hollow cylindrical tube having a right-handed thread on an internal surface of the tube extending approximately one-half its length. This right-handed threaded internal surface is for attachment to a fuel injection pump. The other half of the tube has a left-hand thread on the external surface thereof and a square socket wrench drive cut into the end. The second piece is also a cylindrical hollow tube which has an internal surface with a left-handed thread for rotatable attachment to the left-hand thread on the external surface of the first cylindrical piece. This second piece also has a wrench extension on the opposite end for applying a wrench thereto.

The present invention is for use on Cummins' diesel engines which use in-line mechanical fuel injection pumps as opposed to diesel engines that use electronic injection systems. Although most diesel engines currently being manufactured now employ electronic injection systems, there are many diesel engines still being made and/or still be used in trucks, particularly those made by Dodge, boats and other vehicles which would benefit from the present invention.

SUMMARY OF THE INVENTION

The primary objects of the present invention are to provide a device and method which:

- reduces the time necessary to set the timing of in-line diesel engine injection pumps;
- saves labor;
- is more accurate as a user can turn the fuel injection pump without having to rotate the diesel engine;
- reduces labor costs; and
- reduces costs associated with down time of the diesel engine.

The present invention accomplishes the above and other objects by providing a tool and associated method for setting the timing of a diesel engine injection pump. The tool has two components. One component is a hollow cylindrical tube having right-hand threads on an internal surface of the tube which extends approximately one-half the length of the tube. This internal threaded portion is for rotatable attachment to a fuel injection pump. The approximate remaining half of the first piece contains a left-handed thread on an external surface thereof and a square socket wrench drive cut into the end. The second component of the tool is a hollow cylindrical piece having an internal surface containing a left-handed thread for rotatable attachment to the left-handed thread on the external surface of the first component. The second component further has a wrench extension thereon. The external surface of the second component may be knurled to improve gripping. A method of setting the timing of a diesel engine injection pump using the tool is also provided by which the tool is used to place the injection pump in the proper timing position.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 7 is an end view of the second component from the end which attaches to the fuel pump attachment component;

FIG. 8 is a side view of the entire fuel pump timing tool attached to a socket wrench; and FIG. 9 is a perspective view of the tool being used to turn a fuel injection pump of a diesel engine.

DESCRIPTION OF THE PREFERRED EMBODIMENT

Figure 1:
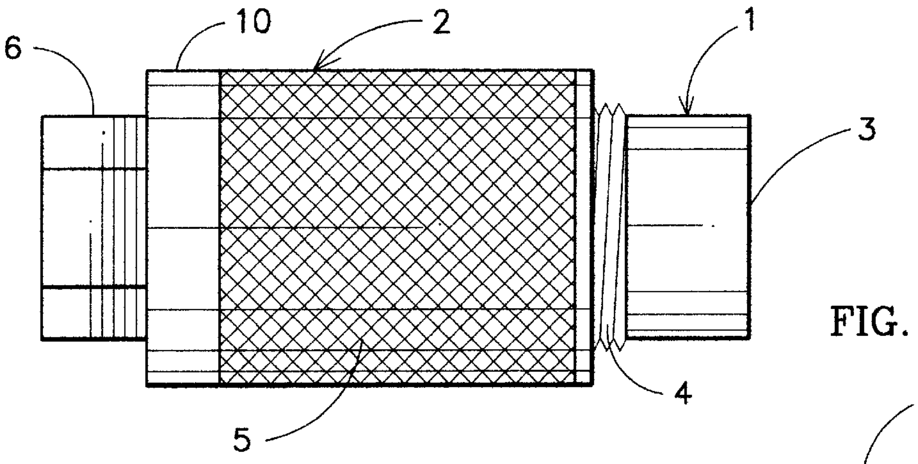
FIG. 1 is a side view of the diesel engine injection pump tool of the present invention.

For purposes of describing the preferred embodiment, the terminology used in reference to the numbered components in the drawings is as follows:

| | |
|---|---|
| 1. fuel pump attachment component | 10. external diameter of socket wrench attachment component |
| 2. wrench attachment component | 11. internal hole |
| 3. opening | 12. internal threads (left-hand) on socket wrench component |
| 4. external threads (left-hand) | 13. socket wrench |
| 5. knurled grip | 14. socket wrench attachment |
| 6. external wrench attachment | 15. diesel engine |
| 7. internal threads (right-hand) | 16. injection pump |
| 8. internal square wrench insert hole | 17. mechanic's arm |
| 9. opening for inserting fuel pump attachment component (1) | |

Referring to the drawings, FIG. 1 shows the entire fuel pump timing tool of this invention consisting of two components, a fuel pump attachment component 1 and a wrench attachment component 2. As shown in FIG. 1 the fuel pump attachment component 1 is rotatably attached to the wrench attachment component 2 by threads 4. The wrench attachment component 2 has an external wrench attachment extension 6 on one end.

Figure 2:
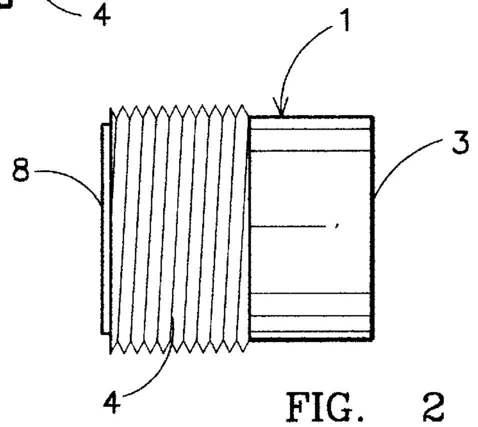
FIG. 2 is a side view of the fuel pump attachment component of the tool.
Figure 3:
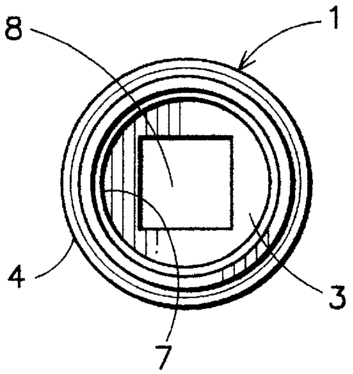
FIG. 3 is an end view of the fuel pump attachment component from the attachment end.
Figure 4:
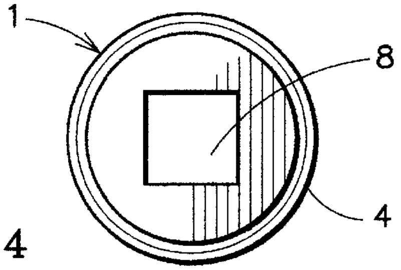
FIG. 4 is an end view of the fuel pump attachment component from the wrench attachment end of such component.

As shown in FIGS. 2, 3 and 4, the fuel pump attachment component 1 contains an external left-hand thread 4 to enable it to be inserted into the left-hand threads of the wrench attachment component 1. The fuel pump attachment component 1 is essentially a hollow tube, which in addition to the external threads 4, has an opening 3 containing right-hand internal threads 7 on the internal surface thereof for rotatably securing it to the fuel injection pump by clockwise rotation of the component 1. The fuel pump attachment component 1 further contains on the opposite end thereof a square socket wrench drive opening 8 which enables the user to insert a socket wrench to rotate it onto the fuel injection pump.

Figure 5:
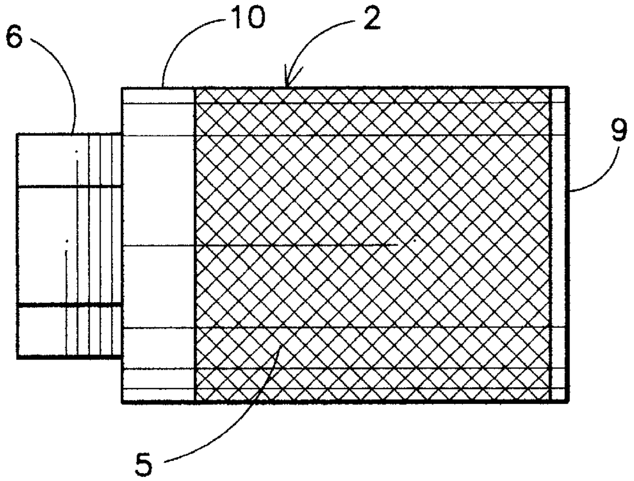
FIG. 5 is a side view of the second component of the fuel pump timing tool.
Figure 6:
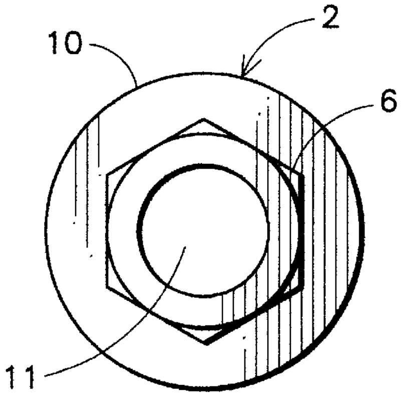
FIG. 6 is an end view of the second component from the wrench attachment end.

In FIGS. 5, 6 and 7 the wrench attachment component 2 is shown by itself. The fuel pump attachment component is essentially cylindrical in nature, having an opening 9 with left-handed threads on the internal surface thereof for rotatably mounting the fuel pump attachment component 1 therein. The wrench attachment component 2 further contains on the opposite end an external wrench attachment 6 so that a wrench may be attached thereto for rotating it onto the fuel pump attachment component 1. The external wrench attachment 6 may have a circular opening 11 therein. In order to increase gripping capabilities the wrench attachment component may have on the outside diameter 10 a knurled grip 5.

Referring now to FIG. 8, the fuel pump timing tool consisting of components 1 and 2 is shown attached to a socket wrench and attachment 13 and 14, respectively. This is how the tool would look when in use.

FIG. 9 shows the fuel pump timing tool 1 and 2 attached to the fuel injection pump 16 of a diesel engine 15 while being rotated by a wrench 13 by a mechanic's arm 17.

The timing tool of this invention would preferably be made of a metal alloy of high tensile strength, such as 4120 chrommolly.

After locating top dead center on the compression stroke of cylinder number one, the procedure for using the timing tool to properly time the fuel injection pump to the diesel engine involves first unlocking the injection pump by removing the nut and lock washer from the pump drive-shaft. Then the fuel pump attachment component 1 of the timing tool is installed on the injection pump drive-shaft and rotated to a torque of approximately 55 ft.-lbs. A gear removal tool is used to remove the drive gear from the pump drive-shaft. The gear removal tool is removed and the wrench attachment or outer component 2 of the timing gear is installed by left hand rotation on the fuel injection pump component 1, which is rotated until contact with the timing gear is made. Then a ⅜" extension and ratchet wrench is attached to the pump attachment component of the timing tool 2 to rotate the pump drive-shaft to the desired location using any one of the three recommended timing methods: (1) the pump pin method; (2) the plunger lift method; or (3) the spill port method.

While maintaining pump location, the outer piece 2 is rotated by hand to push the gear up onto the drive-shaft of the pump. A wrench is attached to outer piece 2 of the timing tool and rotated to tighten the gear to the drive-shaft while the rachet wrench maintains the position of the pump. A torque of 60 ft.-lbs. must now be applied to the wrench attachment component of the timing tool.

Although the position of the cylinder should be at top dead center when commencing this procedure, when using the spill port timing method, one should check the service manual or engine data plate to find the correct engine location as specific degrees before top dead center are required.

Although only one embodiment of the present invention has been described in detail hereinabove, all improvements and modifications to this invention within the scope or equivalents of the claims are covered by this invention.

Having thus described my invention, I claim:

1. A method of setting the timing of a diesel engine injection pump using a tool comprising a pump attachment component being a hollow cylindrical tube having a right-hand thread on an internal surface of the tube extending from one end approximately one-half a length of the tube for attachment to a fuel injection pump and a second half having a left-hand thread on an external surface thereof and a square socket wrench driver cut into an end of said second half; and a wrench attachment component also being a hollow cylindrical tube larger in diameter than the pump attachment component having an external surface and an internal surface containing a left-hand thread for rotatably attaching it to the left-hand thread on the external surface of the pump attachment component and an external wrench attachment socket on an outer end thereof, said method comprising the steps of:

A. unlocking a drive-shaft of the injection pump by removing nut and lock washer;

B. installing the fuel pump attachment component of the timing tool to the pump drive-shaft and rotating it to a proper torque;

C. installing a gear removal tool and removing a drive gear from the injection pump drive-shaft;

D. removing the gear removal tool and installing the wrench attachment component onto the pump attachment component of the timing tool;

E. rotating the pump attachment component until contact with the drive gear is made;

F. rotating the pump drive-shaft to a desired location using a recommended timing method;

G. while maintaining the desired location of the pump, rotating manually the wrench attachment component of the timing tool to push the gear up onto the drive-shaft of the injection pump;

H. rotating the wrench attachment component of the timing tool to tighten the gear to the drive-shaft while maintaining the desired location of the pump; and I. removing the timing tool and locking the pump drive-shaft by reinstalling the lock washer and nut.

* * * * *